United States Patent [19]

Nakamoto

[11] Patent Number: 4,621,612

[45] Date of Patent: Nov. 11, 1986

[54] SOLAR POND AND METHOD OF ESTABLISHING THE SAME

[75] Inventor: Yasunobu Nakamoto, Yokohama, Japan

[73] Assignee: Kabushiki Kaisha Toshiba, Kawasaki, Japan

[21] Appl. No.: 768,227

[22] Filed: Aug. 22, 1985

[30] Foreign Application Priority Data

Aug. 27, 1984 [JP] Japan .............................. 59-176572

[51] Int. Cl.$^4$ ............................................... F24J 3/02
[52] U.S. Cl. ..................................... 126/415; 126/400
[58] Field of Search ............... 126/400, 421, 415, 435, 126/437, 417

[56] References Cited

U.S. PATENT DOCUMENTS

| Re. 30,540 | 3/1981 | Lyon et al. | 126/435 |
|---|---|---|---|
| 3,598,104 | 8/1971 | Trostler | 126/415 |
| 4,244,351 | 1/1981 | Loeb et al. | 126/400 |
| 4,312,323 | 1/1982 | Domenech | 126/415 |
| 4,328,788 | 5/1982 | Wirguin et al. | 126/400 |
| 4,336,999 | 6/1982 | Assaf | 126/415 |
| 4,339,626 | 7/1982 | Fisher et al. | 126/415 |
| 4,377,071 | 3/1983 | Assaf et al. | 126/415 |
| 4,380,993 | 4/1983 | Spitzer | 126/437 |
| 4,498,454 | 2/1985 | Assaf | 126/415 |
| 4,523,629 | 6/1985 | Copeland | 126/437 |

OTHER PUBLICATIONS

Gradient Zone Establishment and Maintenance at TVA's 4000m$^2$(1-Acre) Nonconnecting Salt Gradient Solar Pond; Chinery et al.; Jun. 1-3, 1983.

*Primary Examiner*—Samuel Scott
*Assistant Examiner*—H. A. Odar
*Attorney, Agent, or Firm*—Oblon, Fisher, Spivak, McClelland & Maier

[57] ABSTRACT

A solar pond of large scale comprises an intake and a return outlet which are not fixedly disposed but are movable in the direction of water depth. The intake and the return outlet are connected through a saline water circulation loop in which necessary saline concentrations with respect to water depths of the solar pond can be efficiently obtained. This allows a solar pond with a specified saline concentration gradient to be established and repaired in a brief period.

14 Claims, 7 Drawing Figures

SOLAR POND AND METHOD OF ESTABLISHING THE SAME

BACKGROUND OF THE INVENTION

1. Field of the Invention

This invention relates generally to a solar pond, and more particularly to a saline type (salt gradient) solar pond.

2. Description of the Prior Art

Solar ponds may be generally classified, by the kinds of liquid to be used as the absorbent or heat storage medium of solar energy, into a non-saline type that utilizes homogeneous water (fresh water) and a saline type that utilizes water solutions of various kinds of salt, and also classified by the structures thereof.

Of these types, a saline type solar pond stores salt of various kinds, such as table salt (sodium chloride), magnesium chloride, and boric acid dissolved in a water solution within a relatively shallow pond of approximately 2 to 3 meters in depth. Such a pond establishes a concentration gradient of the solution such that deeper water has a higher concentration and shallower water has a lower concentration, as shown in FIG. 4(b). In this structure, the sun's rays, which are absorbed as heat while penetrating water at water depths corresponding to the respective ray's wavelengths, eventually reach the deepest portion of the pond where all the remaining rays are absorbed. The heated water of the deepest portion never rises because the water of the pond maintains a certain concentration gradient, i.e., a gradient due to specific gravity such that deeper water has a higher specific gravity. All of the water of the pond is thus prevented from undergoing natural convection and, as a result, the water remains heated at high temperatures at lower water depths. This means that the sun's rays are completely converted into heat and absorbed within the water, and the water maintains a certain temperature gradient substantially similar to the concentration gradient of FIG. 4(b).

As described above, a saline type solar pond can obtain higher temperatures as compared to a solar pond of the non-saline type, so that it is most widely used. In general, the salt water solution of the bottom layer (a heat storage layer in FIG. 4(a)) which is heated to the highest temperature is taken out externally so as to be utilized as a heat source.

In the saline type solar pond, it is essentially required to establish a saline concentration gradient corresponding to the respective water depths, and moreover to maintain it all the time during operation. However, this necessitates cumbersome and complicated procedures.

Hitherto, there has been practiced such a method that besides a solar pond, another tank is provided having a salt water solution of a specific concentration and which feeds the same into the solar pond. A solution of lower concentration than the previous one is subsequently prepared in the tank and delivered to the pond on top of the previously fed solution. This procedure is repeatedly performed in several steps so as to sequentially stack layers of solutions of different concentrations until a specified concentration gradient is established. There has also been practiced an extremely simplified method in which salt is directly introduced into a pond so that a salt water solution of high concentration is first prepared, and then fresh water is filled upon this solution so as to cause a natural diffusion.

However, such methods are effective only for a solar pond of a small scale, and in the case of larger practical scales such as a pond having more than several thousand square meters in surface area, the water stored therein generally exceeds ten thousand tons and the salt to be used reaches upward of a thousand tons. As a result, should the above-described methods be employed, a very large tank becomes necessary and, in addition, it takes several months to establish a specified concentration gradient of salt water solution. This inevitably causes restrictions on the scale of solar ponds in terms of economic considerations and time-consuming procedures.

Moreover, once established, the concentration gradient of the salt water solution is gradually lost due to the material diffusion of the salt, thereby making the solution uniform. It is therefore necessary that salt be supplied to the bottom layer of the pond while at the same time, fresh water is sprayed over the surface layer so as to maintain the concentration gradient, and this also necessitates cumbersome and complicated procedures.

Particularly, in the case of conventionally structured solar pond wherein both the intake and the return outlet are fixed in position, when the concentration gradient is destroyed by windstorm or boiling or some other cause, it is almost impossible to repair the concentration gradient so as to recover its original extent in a brief period. Moreover, should this repair be performed, it becomes a large scale and time-consuming procedure in which all the solution in the pond is thrown away, and the gradient is reestablished anew. In addition, should a solution of such a high concentration be discharged from the solar pond into a river, there would be a danger of creating environmental pollution problems.

SUMMARY OF THE INVENTION

Accordingly, one object of this invention is to provide a solar pond of large scale and a method of establishing the same that can establish a necessary concentration gradient of a salt water solution in a brief period.

Another object of this invention is to provide a solar pond of a large scale and a method of establishing the same that can maintain or recover the concentration gradient of a salt water solution in a brief period so as to assure a continuous operation.

Briefly, in accordance with one aspect of this invention, there is provided a solar pond of a large scale wherein an intake and a return outlet are not fixed but can be varied in position in the direction of depth, whereby the initial concentration gradient of a salt water solution can be continuously established in a brief period. In addition, the concentration gradient during operation can be readily maintained.

The method for establishing a solar pond for absorbing and storing solar energy as heat according to the invention includes the steps of predetermining reference values of saline concentrations with respect to water depths of the solar pond; circulating water through a circulation loop including taking and returning water from and into selected depth levels of the solar pond; adjusting concentrations of the water within the circulation loop whereby concentrations at different depth levels are adjusted; changing the positions of taking and returning water to change the selected depth levels; again adjusting concentrations of the water within the circulation loop whereby the concentrations of the changed depth levels are adjusted; and repeating the steps of position changing and concentration adjusting until actual concentrations reach the predetermined reference values at all depths of the solar pond.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
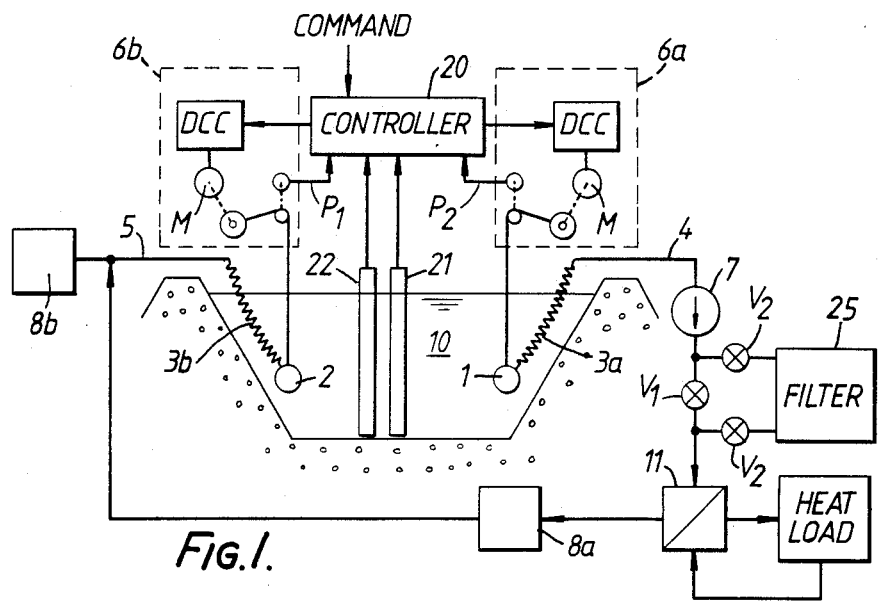
FIG. 1 is a schematic diagram illustrating one embodiment of a solar pond according to the present invention.

Referring now to the drawings, wherein like reference numerals designate identical or corresponding parts throughout the several views, and more particularly to FIG. 1 thereof, one embodiment of this invention will be described. In FIG. 1, an intake 1 and a return outlet 2, both unfixed, are respectively connected through flexible tubes 3a and 3b to an intake tube 4 and a return tube 5. The intake 1 and the return outlet 2 can be controlled in position at the respective water depths by position control apparatus 6a and 6b. Naturally, the control can also be performed in the respective horizontal directions by analogous control structure when required.

The intake tube 4 is connected through a feedwater pump 7 to the primary side entrance of a heat exchanger 11, while the return tube 5 is connected via a tank 8a within a circulation loop to the primary side outlet of the heat exchanger 11. The return tube 5 is also connected to an external tank 8b which supplies water for circulation required in the initial stage of establishing a solar pond, and sprays fresh water (or lower salinity salt water, such as sea water) over the surface layer of the solar pond during operation. Here, the external tank 8b may be connected to either seas or rivers or lakes. The secondary side of the heat exchanger 11 is connected to a heat load.

A solar pond 10 is provided with a temperature detector 21 and a concentration detector 22 that respectively measure temperatures and saline concentrations at all water depths, and the respective signals therefrom are fed into a controller 20. The controller 20 is a conventional programmable device which produces positioning signals on the basis of preprogrammed command signals representing a desired concentration versus water depth, and supplies the same to the position control apparatus 6a and 6b.

The position control apparatus 6a and 6b are respectively constituted by drums that wind and unwind wire ropes connected respectively to the intake 1 and the return outlet 2, electric motors M coupled to the drums, and drive circuits DCC that drive the electric motors M in response to the signals from the controller 20. Further, the position control apparatus 6a and 6b are respective provided with position detectors that detect positions of the intake and return outlets 1 and 2, and the respective signals $P_1$ and $P_2$ therefrom are fed into the controller 20.

First, the operation will be described when the initial concentration gradient of salt water solution is established. The intake 1 and the return outlet 2 are respectively controlled so as to be positioned near the bottom of the solar pond 10, and water is filled therein so that both the intake 1 and the return outlet 2 are submerged. Here, the initial water may be either a salt water solution of a certain concentration which is prepared previously within the tank 8b outside the circulation loop and is injected thereinto, or fresh water for the sake of time-saving. Next, the water in the solar pond 10 is circulated by means of the feedwater pump 7 from the intake 1 to the return outlet 2 through the heat exchanger 11 and the tank 8a in the loop. While circulating water, salt is continuously added to the water within the tank 8a in the loop, and the circulation continues until the saline concentration of the water filled within the first layer of the solar pond 10 reaches a specified level.

Figure 4A:
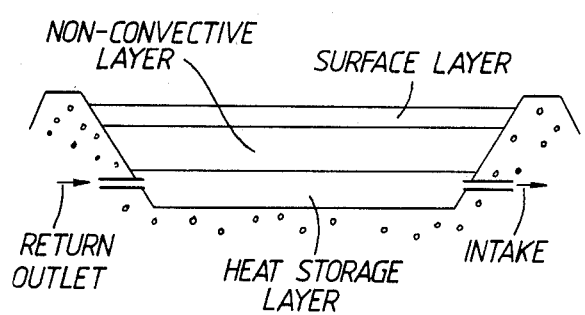
FIGS. 4(a) and 4(b) are respectively a cross-sectional view and a graphical representation to explain a concept of general solar ponds.
Figure 4B:
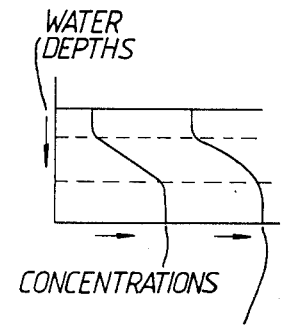

After the concentration of the solution within the first layer has reached the specified level, namely, after the signal from the concentration detector 22 has reached a specified value, the position control apparatus 6a and 6b respectively operate to continuously and gradually lift the intake 1 and the return outlet 2 in synchronism while keeping them at the same level as one another. At the same time the above-described procedures are continuously performed so as to gradually lower the concentration of the solution in accordance with the vertical concentration gradient shown in FIG. 4(b). During these procedures, the feed-water pump 7 need not be stopped. Thus, only by controlling the amount of salt to be supplied into the tank 8a and/or by controlling the lifting speed of the intake 1 and the return outlet 2 by means of the position control apparatus 6a and 6b, a predetermined concentration gradient can be continuously and extremely readily established in a brief period.

The next major functions are the maintenance and recovery of the concentration gradient during operation. During operation, the pump 7 is operated and the controller 20 receives the signals from the concentration detector 22 and the temperature detector 21 compares the same with preprogammed reference values of concentration versus water depth. Difference signals derived from a comparison of actual and reference values are fed into the position control apparatus 6a and 6b which move until the difference signals become zero.

Naturally, the controller 20 may also be designed to monitor during operation the concentrations and temperatures so as to generate an alarm only when they deviate abnormally from the respective specified values. By virtue of this function, the intake 1 and the return outlet 2 may be positioned at a layer wherein the concentration gradient has been destroyed so that the specified concentration may be recovered by recirculation through the tank 8a. Should the concentration gradient be disturbed, or there be any layer whose concentration deviates from its specified value, the intake 1 and the return outlet 2 are positioned by means of the position control apparatus 6a and 6b at the depth of the layer to be repaired, and the water of this layer is circulated by the feed-water pump 7. When the concentration of this layer is required to be raised, salt is supplied into the tank 8a. Conversely, when the concentration is to be lowered fresh water is injected into the tank 8a, and this circulation procedure continues until the saline concentration reaches its specified value.

By virtue of applying this circulation procedure, the thickness of heat storage layers can be arbitrarily varied so as to increase or decrease the entire heat storage mass of the solar pond 10, and the temperature of the solution during operation can be modified so as to perform a flexible operation in accordance with insulation values and a heat load, whereby an extremely serviceable solar pond can be obtained for a wide range of applications.

In such an extreme case when the entire water of the solar pond 10 is agitated by a storm or the like and the concentration gradient thereof disappears resulting in a homogeneous concentration, all the water is conventionally thrown away and the gradient must be reestablished anew, which becomes economically disadvantageous. In addition, the procedures to discard a large quantity of high-concentration saline solution in accordance with such a suitable treatment as to avoid pollution necessitate an enormous expense, space and time. However, according to the present invention, by vitrue of repetition of the aforementioned procedures, the recovery of the concentration gradient of salt water solution in the solar pond can be extremely readily accomplished.

In this case, it is also possible that the intake 1 and the return outlet 2 are positioned at different depths, for example, the intake 1 may be positioned near the surface while the return outlet 2 is deeply positioned so that a high-concentration saline solution in the upper layer transfers to the deeper layer. Also, with the additional use of the tanks 8a and 8b, the concentrations of the respective layers can be maintained and recovered in various combinations.

The substances which can impede the transparency of the water in the solar pond 10, for example, sand, dust, leaves and salt water marine life are all eliminated by means of a filter apparatus 25 provided between the feed-water pump 7 and the heat exchanger 11 without any interruption of the operation of the solar pond 10. The filter apparatus 25 functions such that when a valve $V_1$ is closed and valves $V_2$ are opened, the circulating water passes through a filter so as to be filtered for a specified period of time, and thereafter the valve $V_1$ is opened while the valves $V_2$ are closed so that the circulating water does not pass through the filter.

The above-described procedures can be continuously performed, so that a specified concentration gradient can be accomplished in a brief time, and this is one of the significant advantages according to the present invention.

Figure 2:
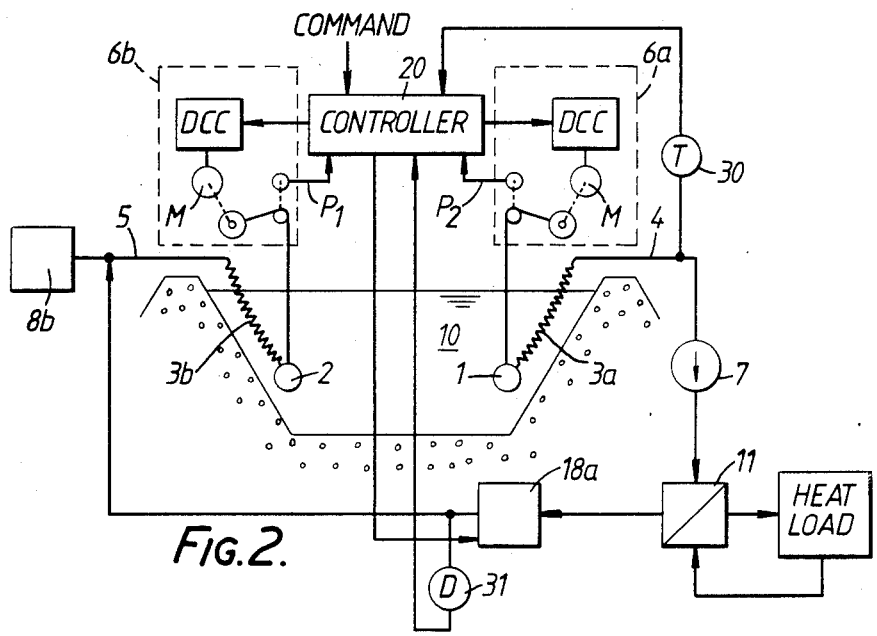
FIG. 2 is a schematic diagram illustrating another embodiment of a solar pond according to the present invention.

FIG. 2 shows another embodiment of a solar pond according to the present invention. Here, the description will be made only as to the differences from the embodiment shown in FIG. 1. In FIG. 2, instead of the concentration detector 22 and the temperature detector 21 both provided within the solar pond 10 of FIG. 1, there are provided a concentration detector 31 and a temperature detector 30 within a circulation loop. Specifically, the temperature detector 30 is disposed on an intake tube 4 so as to detect temperatures of water taken through an intake 1 from a solar pond 10, and the concentration detector 31 is disposed on a tube nearby the exit (downstream) side of a tank 18a in the circulation loop so as to detect saline concentrations of the circulating water. Further, within the tank 18a there are provided a tank filled with high-concentration solution and a tank filled with fresh water (not shown) and valves (not shown) disposed at the respective tanks within tank 18a are controlled so as to be opened or closed on the basis of signals from the controller 20 so that a specified concentration can be obtained. Naturally, salt may be directly introduced into the tank 18a.

The basic operations of the solar pond 10 are identical to those described in the case of FIG. 1, so that the description thereof is omitted.

When the temperature detector 21 detects excessively high temperatures at a certain layer which is nearly boiling with the resulting danger of concentration disturbance, the positions of the intake 1 and the return outlet 2 may be so controlled that the high temperature is reduced and destruction of the solar pond due to boiling can be nipped in the bud.

Figure 3A:
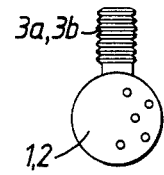
FIGS. 3(a), 3(b) and 3(c) are schematic appearance diagrams respectively illustrating various embodiments of the intake and the return outlet shown in FIG. 1 and FIG. 2.
Figure 3B:
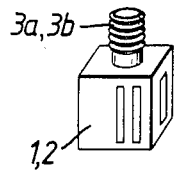
Figure 3C:
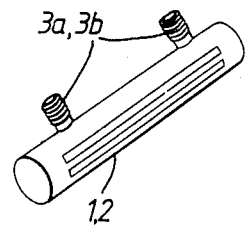

Here, the intake 1 and the return outlet 2 may be spherical or box-shaped and provided with bores or slits as shown in FIGS. 3(a) and 3(b) in the case of smaller scale solar ponds. However, in the case of wider and larger scale solar ponds, they may be tubes provided with slits or many bores as shown in FIG. 3(c). However, the structures per se of the intake 1 and the return outlet 2 are, in fundamental concept, not required to meet particular specifications so long as the subject of the present invention is satisfied. Naturally, there may be provided a plurality of them when required.

Similarly, the flexible tubes 3a and 3b may be either bellows types or any other types with suitable flexibility. Further, the position control apparatus 6a and 6b may be any type of hoisting apparatus such as conventional chain and blocks, and may also be either manually operated apparatus or automatically operated apparatus linked to water-depth measuring instruments.

As described above, according to the present invention, the intake 1 and the return outlet 2 are not fixed but are structured so as to be movable in the direction of depth. Thus, there are provided such advantages that the initial concentration gradient can be continuously and readily established in a brief period, that during operation, partial repairs of the concentration gradient and modifications of the thickness of the heat storage layer can be rapidly and continuously accomplished, and that even when the concentration gradient is destroyed, it can be extremely readily recovered without danger of public pollution, whereby a large scale and highly economical solar pond and method of establishing the same can be provided.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solar pond for absorbing and storing solar energy as heat, comprising:
   pond means for storing water;
   intake means in said pond means for taking water from said pond means;
   return outlet means in said pond means for returning water into said pond means;
   circulation loop means connected between said intake means and said return outlet means;
   feed-water pump means disposed in said circulation loop means;

a tank apparatus disposed in said circulation loop means, said tank apparatus including means for adjusting saline concentrations of water within said circulation loop means;

controller means including saline concentration detector means for detecting saline concentrations of water in said pond means at levels of said pond means corresponding to vertical positions of said intake means, said controller means further including means for producing output signals as a function of said detected saline concentrations; and means for adjusting vertical positions of said intake means and said return outlet means in response to said output signals from said controller means.

2. The solar pond as recited in claim 1, further comprising:

filter means associated with said circulation loop means for eliminating foreign substances included in the water within said circulation loop means.

3. The solar pond as recited in claim 1, further comprising:

temperature detector means for detecting temperatures of water in said pond means at levels corresponding to positions of said intake means, and means for providing output signals from said controller means as a function of said detected temperature for adjusting positions of said intake means and said return means in response to said detected temperatures.

4. The solar pond as recited in claim 1, wherein said concentration detector means is disposed in said pond means and has a length extending in the direction of water depth, said length being at least equal to said water depth.

5. The solar pond as recited in claim 4, wherein said means for adjusting the saline concentration of water includes means for performing said adjusting in response to said output signals from said controller means.

6. The solar pond as recited in claim 1, wherein said concentration detector means is disposed in said circulation loop means at a downstream side of said tank apparatus.

7. The solar pond as recited in claim 6, wherein said means for adjusting the saline concentration of water includes means for performing said adjusting in response to said output signals from said controller means.

8. A solar pond for absorbing and storing solar energy as heat, comprising:

pond means for storing water;

intake means in said pond means for taking water from said pond means;

return outlet means in said pond means for returning water into said pond means;

circulation loop means connected between said intake means and said return outlet means;

feed-water pump means disposed in said circulation loop means;

a tank apparatus disposed in said circulation loop means, said tank apparatus including means for adjusting saline concentrations of the water within said circulation loop means;

controller means including saline concentration detector means for detecting saline concentrations of water in said pond means at levels corresponding to vertical positions of said intake means, said controller means further including means for controlling said means for adjusting such that a predetermined concentration of the water is detected by said concentration detector means, said controller means further including means for changing vertical positions of said intake means and said return outlet means such that said predetermined concentration is obtained.

9. The solar pond as recited in claim 8, further comprising:

temperature detector means for detecting temperatures of water in said pond means at levels corresponding to positions of said intake means, and means for providing output signals from said controller means as a function of said detected temperature for adjusting positions of said intake means and said return means in response to said detected temperatures.

10. A method for establishing a solar pond for absorbing and storing solar energy as heat, comprising the steps of:

predetermining reference values of saline concentrations with respect to water depths of said solar pond;

circulating water through a circulation loop including taking and returning water from and into selected depth levels of said solar pond via intake means and return outlet means;

adjusting concentrations of the water within said circulation loop whereby said saline concentrations at said depth levels are adjusted;

changing the positions of taking and returning water to change said selected depth levels by vertically moving said intake means and return outlet means;

again adjusting concentrations of the water within said circulation loop whereby said saline concentrations of said changed depth levels are adjusted; and repeating said steps of position changing and concentration adjusting until actual saline concentrations reach said predetermined reference values at all said water depths of said solar pond.

11. The method for establishing a solar pond as recited in claim 10, further comprising the steps of:

detecting saline concentrations of the water within said solar pond; and adjusting said saline concentrations of the water within said circulation loop on the basis of a comparison between said detected saline concentrations and said predetermined reference values of saline concentrations.

12. The method for establishing a solar pond as recited in claim 11, further comprising the step of:

filtering foreign substances included in the water within said circulation loop.

13. The method of establishing a solar pond as recited in claim 10, further comprising the steps of:

detecting temperatures of the water within said solar pond, and adjusting temperatures of the water within said circulation loop on the basis of comparison between said detected temperatures and predetermined reference temperatures.

14. The method for establishing a solar pond as recited in claim 13, further comprising the step of:

filtering foreign substances included in the water within said circulation loop.

* * * * *